(12) United States Patent
McGuire et al.

(10) Patent No.: US 9,664,248 B2
(45) Date of Patent: May 30, 2017

(54) ELECTRIC POWER STEERING ISOLATOR

(71) Applicant: GM GLOBAL TECHNOLOGY OPERATIONS LLC, Detroit, MI (US)

(72) Inventors: Michael E. McGuire, Milford, MI (US); Amy K. Luebke, Northville, MI (US); Charles C. Weddle, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 200 days.

(21) Appl. No.: 14/450,916

(22) Filed: Aug. 4, 2014

(65) Prior Publication Data

US 2016/0033001 A1 Feb. 4, 2016

(51) Int. Cl.
*B62D 5/04* (2006.01)
*F16F 15/00* (2006.01)

(52) U.S. Cl.
CPC .......... *F16F 15/002* (2013.01); *B62D 5/0421* (2013.01); *F16F 15/005* (2013.01)

(58) Field of Classification Search
CPC ...... B62D 5/04; B62D 5/0403; B62D 5/0406; B62D 5/0409
USPC ...... 180/443, 444, 446, 771, 779; 188/266.7
See application file for complete search history.

(56) References Cited

U.S. PATENT DOCUMENTS

| 2,344,848 | A | * | 3/1944 | Berry | B62D 1/16 280/780 |
| 2002/0092699 | A1 | * | 7/2002 | Worrell | B62D 7/222 180/443 |
| 2002/0130533 | A1 | * | 9/2002 | Hartel | B62D 25/145 296/193.02 |
| 2005/0167966 | A1 | * | 8/2005 | Fischer | B62D 7/224 280/779 |
| 2010/0305837 | A1 | * | 12/2010 | Gagliano | F16F 15/02 701/111 |

FOREIGN PATENT DOCUMENTS

| DE | 19511273 | * | 10/1995 |
| DE | 102013004651 | * | 9/2014 |
| KR | 2010022352 | * | 3/2010 |

* cited by examiner

*Primary Examiner* — Anne Marie Boehler
(74) *Attorney, Agent, or Firm* — Lorenz & Kopf, LLP

(57) ABSTRACT

Electric power steering systems and a method for controlling an electric power steering system are provided. The method, for example, includes, but is not limited to, determining, by a controller, a speed of a vehicle based upon data from a sensor, and adjusting, by the controller, a stiffness of an isolator in an electric power steering system via at least one piezoelectric device embedded in the isolator based upon the determined speed of the vehicle.

12 Claims, 2 Drawing Sheets

ELECTRIC POWER STEERING ISOLATOR

TECHNICAL FIELD

The technical field generally relates to electric power steering systems, and more particularly relates to an isolator for reducing noise and vibration in an electric power steering system.

BACKGROUND

Electric power steering systems help drivers steer by augmenting steering effort of a steering wheel in a vehicle. Electric actuators or an electric motor in the electric power steering system add controlled energy to the steering mechanism so the driver needs to provide only modest effort regardless of conditions. Power steering helps considerably when a vehicle is stopped or moving slowly. Also, power steering provides some feedback of forces acting on the front wheels to give an ongoing sense of how the wheels are interacting with the road. However, the electric actuators or electric motor can also add noise and vibration into the steering system which can be felt or heard by the driver of the vehicle.

SUMMARY

An electric power steering system is provided for a vehicle. In one embodiment, the vehicle includes a steering wheel and an electric power steering system, including, but not limited to, a steering gear mechanically coupled to the steering wheel, an isolator arranged between the steering gear and a body of the vehicle, and at least one piezoelectric device embedded in the isolator A method is provided for controlling an electric power steering system. In one embodiment, the method includes, but is not limited to, determining, by a controller, a speed of a vehicle based upon data from a sensor, and adjusting, by the controller, a stiffness of an isolator in an electric power steering system via at least one piezoelectric device embedded in the isolator based upon the determined speed of the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As discussed above, electric motors or actuators in an electric power steering system can add noise and vibration into a steering system. Accordingly, an electric power steering system with an isolator is provided to reduce the noise and vibration. The isolator includes at least one piezoelectric device embedded within the isolator. The piezoelectric device can be used to soften or harden the isolator, absorb vibration caused by the electric motor, or a combination thereof. By softening the isolator at low speeds and stiffening the isolator at higher speeds, the isolator can effectively reduce the noise and vibration in the electric power steering system without affecting the handling of the vehicle.

Figure 1:
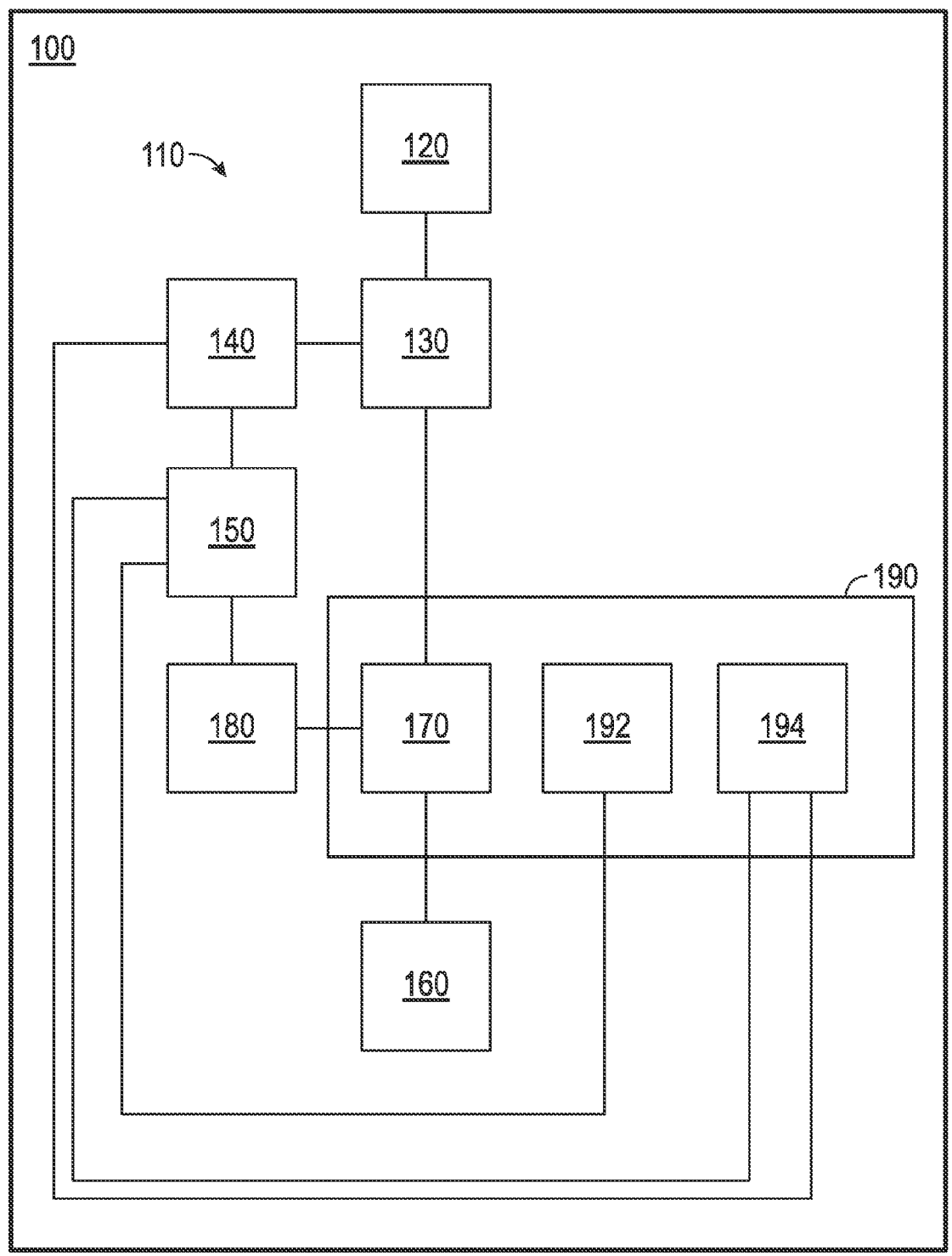
FIG. 1 is a block diagram of a vehicle having an electric power steering system, in accordance with an embodiment.

FIG. 1 is a block diagram of a vehicle 100 having an electric power steering system 110 in accordance with an embodiment. In one embodiment, for example, the vehicle 100 may be an automobile. However, the vehicle 100 may be any type of vehicle which utilizes an electric power steering system 110, including, but not limited to, aircraft, spacecraft, watercraft, or the like.

The electric power steering system 110 includes a steering wheel 120 coupled to a steering shaft 130. When a vehicle operator turns the steering wheel 120, the steering shaft 130 rotates a corresponding amount. One or more sensors 140 are coupled to the steering wheel 120, steering shaft 130 or another vehicular component. In one embodiment, for example, the sensor(s) 140 may include a torque sensor coupled to the steering shaft 130. The torque sensor is configured to output a signal corresponding to the torque being applied to the steering wheel 120 by a vehicle operator. In one embodiment, for example, the torque sensor may include a torsion bar and a variable resistive-type sensor. However, one of ordinary skill in the art would recognize that the torque sensor may be constructed in a variety of ways. The data from the torque sensor may be used to determine how much assist to apply to the steering system, as discussed in further detail below.

Another sensor 140 in the vehicle 100, for example, may be a speed sensor. In one embodiment, for example, the speed sensor may be mounted proximate to a wheel of the vehicle and configured to output a signal corresponding to the rotational velocity of the wheel. However, one of ordinary skill in the art would recognize that there are a large variety of speed sensor types and speed sensor mounting locations. As discussed in further detail below, the data from the speed sensor may be used to determine a stiffness of an isolator in the electric power steering system 110.

In one embodiment, for example, one or more of the sensors 140 may be a vibration sensor. The vibration sensor may output data corresponding to a frequency of vibration in the electric power steering system. The data from a vibration sensor may be used, for example, to determine when vibrations at certain predetermined frequencies are present in the electric power steering system 110. As discussed in further detail below, the existence of vibrations at certain frequencies can trigger a response from the electric power steering system to reduce or remove the vibrations.

Other sensor(s) 140 in the vehicle 100 may be, for example, steering wheel angle sensors and/or yaw sensors. The data from the steering wheel angle sensors and/or yaw sensors may be used, for example, to determine how much assist the electric power steering system 110 has to provide.

The sensor(s) 140 are configured to transmit data to one or more controllers 150 either directly or through another system in the vehicle 100. As discussed in further detail below, the controller(s) 150 controls one or more components of the electric power steering system 110. The controller(s) 150 may be dedicated to the electric power steering system 110 and/or may be shared with another system in the vehicle 100. In one embodiment, for example, the controller(s) 150 may be a processor such as a central processing unit (CPU), a physics processing unit (PPU), a microcontroller, an application specific integrated circuit (ASIC), a field programmable logic array (FPGA), or any other logic device or any combination thereof. In one embodiment, for example, a controller 150 may be an engine control module (ECM) or a body control module (BCM).

The steering shaft 130 is coupled to a steering system 160. The steering system 160 may be, for example, a rack and pinion steering system, a recirculating ball steering system, belt rack electric power steering system, dual pinion electric power steering system, or the like. The steering shaft 130 is also connected to a steering gear 170. The steering gear 170 is coupled to a motor 180, which provides torque assist to the steering gear 170 to assist vehicular operator in rotating the tires of the vehicle through the steering system 160. In one embodiment, for example, the steering gear 170 may be, for example, belt rack electric power steering system, dual pinion electric power steering system or the like. In one embodiment, for example, the motor 180 may be, for example, an electric motor connected to a ball nut via a belt, an electric motor connected to the steering gear 170 via gearing, an electric motor connected directly to the steering gear 170 via a pinion, or the like.

The motor 180 is controlled by one or more of the controller(s) 150. The controller(s) 150 output a signal to the motor 180 to apply a torque to the steering gear 170 based upon data from the one or more sensors 140, for example, a torque sensor. Controller(s) 150 receive data from the sensor(s) 140 to determine the appropriate level of assist as predetermined by the controller calibration. Controller 150 then sends the appropriate power to the motor 180 for a given time to reach the prescribed level of assist. This process repeats as driver input and vehicle response vary.

The electric power steering system 110 further includes an isolator 190. The isolator 190 is arranged between the steering gear 170 and a body or chassis structure of the vehicle (not shown). Typical configurations include, but are not limited to, isolator 190 pressed into steering gear housing with a bolt going to the vehicle structure, isolator 190 pressed into the chassis structure, or engine cradle, with a bolt going to the steering gear 170, isolator 190 pressed into the vehicle body structure with a bolt going to the steering gear 170. The isolator 190 acts to absorb noise and vibration generated from the motor 180. In one embodiment, for example, the isolator 190 may be formed from rubber or another elastic material such as natural rubber, butyl rubber, ethylene propylene diene M-Class rubber (EPDM), and in some cases high damped natural rubber.

Figure 3:
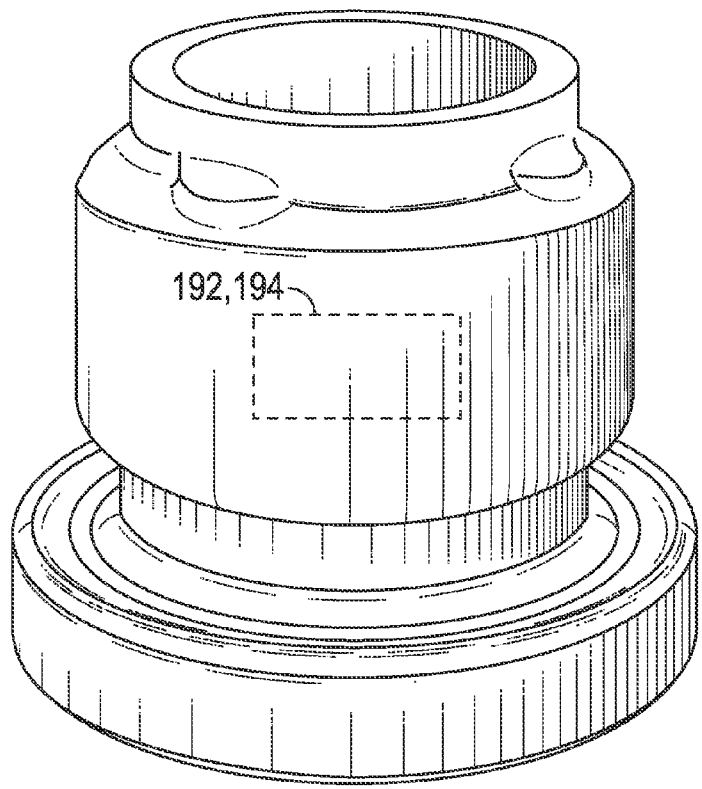
FIG. 3 illustrates a multidimensional view of an isolator, in accordance with an embodiment.

FIG. 3 illustrates a multidimensional view of an isolator 190, in accordance with an embodiment. The isolator 190 includes one or more variable rate isolators 192 embedded therein, one or more variable damper isolators 194 embedded therein, or a combination of variable rate isolator(s) 192 and variable damper isolator(s) 194. In one embodiment, for example, the variable rate isolator(s) 192 and/or variable damper isolator(s) 194 may be included in the molding process to reside inside the rubber element of the isolator 190. However, in other embodiments, for example, the variable rate isolator(s) 192 and/or variable damper isolator(s) 194 may be coupled to the isolator 190 via an adhesive application, post process bonding, in process bonding, or any combination thereof. The variable rate isolator(s) 192 and/or variable damper isolator(s) 194 may be embedded and/or attached along any portion of the isolator 190. The variable rate isolator(s) 192 and/or variable damper isolator(s) could be arranged either radially (i.e., perpendicular to the steering shaft 130) or axially (i.e., parallel to the steering shaft 130). While not illustrated in FIG. 3, a switch may be embedded and/or attached proximate to a variable rate isolator 192 or variable damper isolator. The switch may be used by the controller 150 to control the variable rate isolator 192 or variable damper isolator. Alternatively, a control switch may be located elsewhere in the electric power steering system 110 and coupled to a variable rate isolator 192 or variable damper isolator via any known electrical connection (e.g., a wire).

Returning to FIG. 2, the variable rate isolator(s) 192 is capable of adjusting a stiffness of the isolator 190. As discussed above, the motor 180 generates noise and vibration relatively proportional to the input from the vehicle operator. In other words, the larger the input (i.e., the larger the turning angle) from the vehicle operator the more noise and vibration is generated by the motor 180 as the motor has to apply more force to assist the user in turning the steering system 160. A softer isolator 190 will absorb more noise and vibration from the motor. However, a softer isolator 190 increases a delay between when an input is applied to the steering wheel 120 by the vehicle operator and when the electric power steering system 110 responds to the input, resulting in steering response that does not meet customer expectations. At slower speeds, for example, less than around 25 miles per hour (e.g., parking lot speeds), the delay from a softer isolator 190 may be acceptable. But at higher speeds, a more responsive electric power steering system 110, and, thus, a stiffer isolator 190 is desirable. Accordingly, the controller 150 controls the variable rate isolator(s) 192 to alter the stiffness of the isolator 190 based upon the speed of the vehicle 100. At slower vehicular speeds, the controller 150 controls the variable rate isolator(s) 192 to allow the isolator to become softer. At higher speeds, when less input from the vehicular operator and, thus, less noise from the motor 180 is expected, the controller 150 controls the variable rate isolator(s) 192 to allow the isolator 190 to become stiffer. Thus, any delay in the response of the electric power steering system 110 response is minimized at higher speeds improving the handling of the vehicle 100, while at lower speeds the noise and vibration from the motor 180 is reduced.

The variable rate isolator(s) 192 may be constructed, for example, from a piezoelectric material such as crystal, ceramic, or the like. Thus, the controller 150 may alter a stiffness of the isolator 190 via the variable rate isolator(s) 192 by applying a voltage to the variable rate isolator(s) 192. In one embodiment, for example, when the speed of the vehicle 100 is above a predetermined threshold, the controller 150 is configured to apply a first voltage to the variable rate isolator(s) 192. The voltage causes the variable rate isolator(s) 192 to expand, thereby stiffening the isolator 190. In this embodiment, when the vehicle is below the predetermined threshold, the controller may apply a second voltage to the to the variable rate isolator(s) 192, the second voltage being less than the first voltage, or may not apply a voltage to the variable rate isolator(s) 192, thereby allowing the isolator to become less stiff at the slower speed. In other embodiments, for example, the controller 150 may monitor the vehicle 100 for multiple predetermined speed thresholds, where the controller 150 applies a unique voltage to the variable rate isolator(s) 192 at each speed range (i.e., the range of speeds between the multiple predetermined speed thresholds). In yet other embodiments, for example, the controller 150 may linearly increase the voltage being applied to the variable rate isolator(s) 192 based upon a speed of the vehicle.

As discussed above, the motor 180, and the electric power steering system 110 in general, may be susceptible to generating vibration. The vibration can occur at certain resonant frequencies. These vibrations can pass through the electric power steering system 110 and can be felt by the vehicular operator. The resonant frequency at which the electric power steering system 110 can vibrate can vary from vehicle to vehicle. Furthermore, the electric power steering system 110 may be subject to more than one resonant frequency depending upon the speed of the vehicle 100, a vehicle mass, a steering system mass, and stiffness of all systems involved. Accordingly, the isolator 190 may be fitted with one or more variable damper isolator(s) 194 to absorb or dissipate one or more resonant frequencies. In one embodiment, for example, the variable damper isolator(s) 194 may be constructed from one of the piezoelectric materials discussed above. The variable damper isolator(s) 194 may be a separate piezoelectric device from the variable rate isolator(s) 192. However, a single piezoelectric device could also be used as both a variable rate isolator 192 and a variable damper isolator 194.

The variable damper isolator 194 may actively or passively reduce the vibrations in the electric power steering system 110. In a passive variable damper isolator 194, the size or shape of the variable damper isolator 194 and/or the material the variable damper isolator 194 is constructed from may be selected to correspond to a resonant frequency. In other words, the variable damper isolator 194 may be susceptible to vibrating at a certain frequency based upon its size, shape and/or material. When the electric power steering system 110 begins to vibrate at the corresponding resonant frequency, the passive variable damper isolator 194 absorbs the vibrations by turning the vibration into heat or electricity. The energy generated by the passive variable damper isolator 194 can be dissipated in a variety of ways such as through the body of the steering gear 170 or returned back to the electrical system as reclaimed energy. When the electric power steering system 110 is susceptible to multiple resonant frequencies, multiple passive variable damper isolators 194 can be mounted in the isolator 190, each corresponding to one of the resonant frequencies.

In an active variable damper isolator 194, the controller 150 is configured to apply an oscillating voltage to the active variable damper isolator 194. The oscillating voltage causes the active variable damper isolator 194, and thus the isolator 190, to vibrate. The frequency and amplitude of the vibration caused by the active variable damper isolator 194 can be selected to match the frequency and amplitude of the vibration caused by the motor 180. However, by shifting the phase of the vibration from the active variable damper isolator 194 by about one hundred and eighty degrees, the vibration from the active variable-damper isolator 194 cancels out the vibration from the motor 180 such that there is little to no vibration at the frequency. In one embodiment, for example, the controller 150 receives vibration data from one or more sensors 150. The controller 150 then analyzes the received data to determine whether one or more resonant frequencies are present in the electronic power steering system 110. If there are one or more resonant frequencies present in the electronic power steering system 110, the controller 150 then applies the oscillating voltage to one or more active variable damper isolator(s) 194 to damp the one or more resonant frequencies. When there are multiple active variable damper isolator(s) 194 in the electronic power steering system 110, each active variable damper isolator 194 may be used to damp a different resonant frequency present in the electronic power steering system 110.

Figure 2:
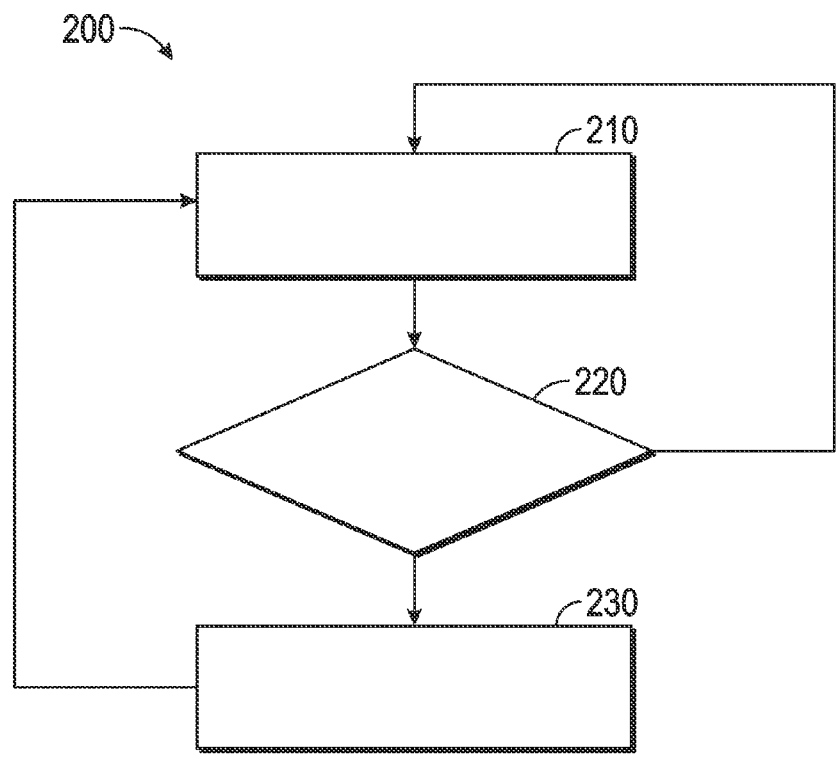
FIG. 2 illustrates a method for reducing noise and vibration in an electronic power steering system, in accordance with an embodiment.

FIG. 2 illustrates a method 200 for reducing noise and vibration in an electronic power steering system 110, in accordance with an embodiment. If the isolator 190 includes one or more variable rate isolators 192, the controller 150 first adjusts a stiffness of the isolator 190 based upon the speed of the vehicle 100. (Step 210). In one embodiment, for example, the isolator 190 may have two stiffness settings, a softer setting and a harder setting. In this embodiment, for example, the controller 150 may soften the isolator 190 using the one or more variable rate isolators 192 when the vehicle is below a predetermined speed and stiffen the isolator 190 using the one or more variable rate isolators 192 when the vehicle is above the predetermined speed. In one embodiment, for example, the predetermined speed may be 25 miles per hour. However, one of ordinary skill in the art would recognize that the predetermined speed may widely vary. In other embodiments, for example, the isolator may have many stiffness settings each corresponding to a different speed range. In yet other embodiments, the controller 150 may increase the stiffness proportionally to an increase in speed. In other words, the stiffness of an isolator 190 may increase linearly or even exponentially with the speed of the vehicle.

If the isolator 190 includes one or more variable damper isolators 194, the controller 150 then determines if there is one or more undesirable frequencies in the electric power steering system. (Step 220). In one embodiment, for example, one of the sensors 140 may be a vibration sensor. The controller 150 may, for example, analyze data from one of the sensors 140 to determine if there are one or more undesirable frequencies in the electric power steering system 110. In another embodiment, for example, the vibration signature may also be sensed by a variable rate damper isolator 194. If there are no undesirable frequencies in the electric power steering system 110, the controller 150 returns to Step 210. If there are one or more undesirable frequencies in the electric power steering system 110, the controller 150 damps the isolator 190 via one or more of the variable damper isolators 194 corresponding to the one or more undesirable frequencies. (Step 230). As discussed above, the isolator may include active or passive variable damper isolators 194, or a combination thereof. When the variable damper isolator(s) 194 are a passive system, the variable damper isolator(s) 194 naturally vibrate at certain frequencies caused by the motor 180. As a result of the passive variable dampener isolators 194 vibrating, the passive variable dampener isolators 194 damp the vibrations caused by the motor by turning the vibrations caused by the motor 180 into electricity or heat. When the variable damper isolator 194 is an active system, the controller 150 applies a voltage waveform corresponding to the frequency of vibration to the variable damper isolators 194, as discussed above. The variable damper isolator 194, as a result from the waveform, vibrates at the frequency of vibration caused by the motor. However, the controller 150 applies the waveform out of phase from the vibration caused by the motor 180. Accordingly, the vibration caused by the variable damper isolators 194 effectively cancels out the vibration caused by the motor 180. The controller 150 then returns to Step 210.

While the embodiment illustrated in FIG. 2 includes methods of controlling both a variable rate isolator 192 system and a variable damper isolator 194, one of ordinary skill in the art would recognize that the method may be modified when the isolator 190 includes only one of the variable rate isolator 192 or variable damper isolator 194.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling an electric power steering system, comprising:
   determining, by a controller, a speed of a vehicle based upon data from a sensor; and
   adjusting, by the controller, a stiffness of an isolator arranged between a steering gear and a body of the vehicle in the electric power steering system via at least one piezoelectric device embedded in the isolator based upon the determined speed of the vehicle,
   wherein the controller is configured to soften the isolator when the determined speed of vehicle is under a predetermined speed and further configured to harden the isolator when the determined speed of the vehicle is over a predetermined speed.

2. The method of claim 1, further comprising:
   determining, by the electric power steering system, when a vibration of a predetermined frequency is present in the electric power steering system; and
   damping the isolator via one of the at least one piezoelectric device embedded in the isolator when the vibration of the predetermined frequency is determined to be present in the electric power steering system.

3. The method of claim 2, wherein the damping further comprises applying a voltage waveform to the one of the at least one piezoelectric device embedded in the isolator based upon a frequency of vibration in the electric power steering system.

4. A vehicle, comprising:
   a steering wheel; and
   an electric power steering system, comprising:
      a steering gear mechanically coupled to the steering wheel,
      an isolator arranged between the steering gear and a body of the vehicle,
      at least one piezoelectric device embedded in the isolator;
      a controller electrically coupled to the at least one piezoelectric device;
      wherein the controller is configured to adjust a stiffness of the isolator by applying a voltage to the at least one piezoelectric device embedded in the isolator, and
      wherein the controller is configured to soften the isolator when the vehicle is travelling under a predetermined speed and further configured to harden the isolator when the vehicle is travelling over a predetermined speed.

5. The vehicle of claim 4, wherein one of the at least one piezoelectric devices is a passive damper configured to dissipate a frequency of vibration in the electric power steering system.

6. The vehicle of claim 5, wherein the vehicle includes a plurality of piezoelectric devices configured as a passive damper, wherein each piezoelectric device is configured to dissipate a different frequency of vibration in the electric power steering system.

7. The vehicle of claim 4 wherein the controller is configured to damp vibration in the electric power steering system by applying a voltage to the at least one piezoelectric device embedded in the isolator.

8. The vehicle of claim 7, wherein the controller is configured to apply a voltage waveform to the at least one piezoelectric device embedded in the isolator based upon a frequency of vibration in the electric power steering system.

9. An electric power steering system, comprising:
   a steering gear;
   an isolator configured to be arranged between the steering gear and a body of a vehicle,
   at least one piezoelectric device embedded in the isolator;
   a controller electrically coupled to the at least one piezoelectric device, wherein the controller is configured to adjust a stiffness of the isolator by applying a voltage to the at least one piezoelectric device embedded in the isolator,
   wherein the controller is configured to soften the isolator when the vehicle is travelling under a predetermined speed and further configured to harden the isolator when the vehicle is travelling over a predetermined speed.

10. The electric power steering system of claim 9, wherein one of the at least one piezoelectric devices is a passive damper configured to dissipate a frequency of vibration in the electric power steering system.

11. The electric power steering system of claim 10, wherein the electric power steering system includes a plurality of piezoelectric devices configured as passive dampers, wherein each piezoelectric device is configured to dissipate a different frequency of vibration in the electric power steering system.

12. The electric power steering system of claim 9, further comprising a controller electrically coupled to the at least one piezoelectric device, wherein the controller is configured to damp vibration in the electric power steering system by applying a voltage to the at least one piezoelectric device embedded in the isolator.

* * * * *